United States Patent [19]

Rust et al.

[11] Patent Number: 4,876,621

[45] Date of Patent: Oct. 24, 1989

[54] LINE PROTECTOR FOR A COMMUNICATIONS CIRCUIT

[75] Inventors: Wayne Rust, Berwyn; Alexander G. Gilberts, Algonquin, both of Ill.

[73] Assignee: Reliance Comm/Tec Corporation, Chicago, Ill.

[21] Appl. No.: 281,492

[22] Filed: Dec. 8, 1988

[51] Int. Cl.[4] .............................................. H02H 9/04

[52] U.S. Cl. ...................................... 361/58; 361/119; 361/120; 361/127; 361/106; 337/28

[58] Field of Search .................. 361/58, 111, 117-120, 361/126-130; 337/28, 29; 379/412; 313/325, 634

[56] References Cited

U.S. PATENT DOCUMENTS

| | | | |
|---|---|---|---|
| 3,849,750 | 11/1974 | Baumbach et al. | 337/32 |
| 3,975,664 | 8/1976 | Baumbach | 361/124 |
| 4,459,632 | 7/1984 | Nijman et al. | 361/56 |
| 4,729,055 | 3/1988 | Dorival et al. | 361/119 |

*Primary Examiner*—Todd E. Deboer
*Attorney, Agent, or Firm*—Michael M. Rickin

[57] ABSTRACT

A line protector for a communications circuit. The line protector has an overvoltage arrestor such as a three electrode gas tube, two of whose electrodes are connected to the line input terminals of the protector by associated conductive elements projecting from the protector base. The third electrode is connected to the ground terminal. The line protector also has two positive temperature coefficient resistors (PTCRs) which protect against marginal overcurrents. Conductive elements connected to the line protector's equipment terminals also project from the base in the same direction as the line input terminal conductive elements project. Each PTCR is in contact with an associated one of the two line input terminal conductive elements and an associated one of the two equipment terminal conductive elements.

10 Claims, 4 Drawing Sheets

LINE PROTECTOR FOR A COMMUNICATIONS CIRCUIT

BACKGROUND OF THE INVENTION

1. Field of the Invention

The present invention relates to protector modules which are used in various locations such as telephone central offices to protect the inside equipment from damage as a result of overvoltage and overcurrent conditions that may occur on the outside lines and more particularly to such a module which uses positive temperature coefficient resistors (PTCRs) to provide overcurrent protection.

2. Description of the Prior Art

There are many well known modules which are used at telephone company central offices and increasingly at other locations to provide protection against any overvoltage and overcurrent conditions that may occur on the telephone line pair. One example of such a module is that shown in U.S. Pat. No. 3,975,664 (hereinafter the '664 patent) which is assigned to the same assignee as is the present invention.

The module described in the '664 patent uses a three element cold cathode gas tube to provide protection against an overvoltage condition on the telephone line pair to which the module is connected. Protection against a sustained overcurrent condition (an overcurrent associated with an overvoltage of sufficient amplitude to cause the gas tube to conduct) on the line pair is provided by having slugs of low melting point solder in contact with the end terminals of the gas tube. The occurrence of a sustained overcurrent condition on either line of the line pair protected by the module causes the associated slug to melt. The melting of the slug allows the associated end terminal of the gas tube to come in contact with the ground terminal of the module, there by permanently grounding the associated line. A more detailed description of how the module shown in the '664 patent provides overvoltage and sustained overcurrent protection may be obtained by referring to that patent.

The module described in the '664 patent does not provide protection against a marginal overcurrent condition, i.e., an overcurrent condition associated with an overvoltage which is not of sufficient amplitude to cause the gas tube to conduct. In other words, a marginal overcurrent does not flow through the gas tube. Therefore, the module of the '664 patent should not be used with those line pairs where such a condition may occur.

As discussed in the '664 patent, the module disclosed therein has certain advantages. Among them are the elimination of a spring to carry large overcurrents of long duration, relatively short current paths, standard 5 pin base, ease of assembly and its relatively small and compact configuration. It is desirable that such a module also be capable of protecting against marginal overcurrents.

Protection against such overcurrents has typically been provided by using an in-line heat coil which heats a fusible solder element. The solder element melts during the occurrence of such a condition. One example of a protector module which uses heat coils is disclosed in U.S. Pat. No. 3,849,750 (hereinafter the '750 patent) also assigned to the same assignee as is the present invention. As shown in the '750 patent, the heat coil and overvoltage protection device, e.g., two element gas tube, are in-line and coaxial. In addition, a spring is used to bring a pair of contacts together to form the direct metallic path from the line to ground when the heat coil fusible element melts.

While it is desirable to provide protection against marginal overcurrents in a module of the type shown in the '664 patent, it is not feasible to use a heat coil therein for such protection. A comparison of the structure of the modules of the '664 and '750 patents makes that clear. In addition, a heat coil is undesirable in that when it does operate to provide protection against marginal overcurrents, the fusible solder melts and the line is permanently grounded. It is then necessary to replace the module. Until that is done, the telephone line is out of service.

It was then decided to provide such protection in a module of the type shown in the '664 patent by using a solid state device, such as a PTCR, whose resistance substantially increases when current flow through the device causes the device temperature to reach a predetermined temperature above ambient. Such a device performs the same function as a heat coil in that current is limited, but without the undesirable permanent grounding of the line described above. The flow of an overcurrent through the device causes its temperature to reach that temperature at which the resistance of the device abruptly increases by several orders of magnitude to thereby limit the current. When the overcurrent condition ceases, the device cools and its resistance decreases to its ambient temperature value. The device is then ready for the next occurrence of an overcurrent condition.

SUMMARY OF THE INVENTION

A line protector for a communications circuit. The line protector has an insulating base. It also has a surge voltage arrestor which has opposed electrodes.

The line protector further includes first and second conductive elements in the base. The elements each project in one direction from the base and are in electrical contact, respectively, with the opposed electrodes. It also includes third and fourth conductive elements in the base. The third and fourth elements also project from the base in the same direction that the first and second elements project and are in spaced relationship with the first and second elements.

The line protector further includes two devices, one of which is in contact with the first and third elements to provide a conductive path between those elements and the other of which is in contact with the second and fourth elements to provide a conductive between those elements. Each of the devices has the capability to limit the amplitude of the current flowing through it to be no greater than a predetermined amplitude.

DESCRIPTION OF THE PREFERRED EMBODIMENT

Figure 1:
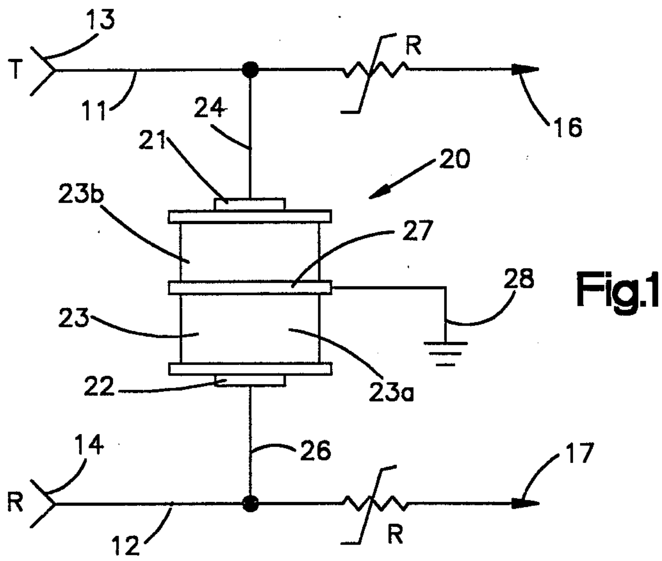
FIG. 1 is a simplified schematic diagram illustrating a telephone line pair with a protector device connecting each line to ground in an overvoltage and/or overcurrent condition.

Referring now to FIG. 1, there is shown a simplified circuit of a telephone line pair, i.e., tip (T) and ring (R), with the protector module of the present invention illustrated somewhat diagramatically and connected therebetween. As FIG. 1 is, except as otherwise described below, identical to FIG. 1 of the '664 patent, the same reference numerals are used to identify the same elements. It is not necessary then to describe how three element gas tube protector element 20 provides a connection to ground for a sustained overvoltage appearing either on tip line 11 at terminal 13 or ring line 12 at terminal 14. The '664 patent provides such an explanation (which is expressly incorporated herein by reference) and in any case the operation of the three element gas tube protector element in the circuit shown in FIG. 1 is now very well known to those skilled in the art.

The difference between FIG. 1 of the present invention and FIG. 1 of the '664 patent is the connection of each of the junction of tip line 11 and conductor 24 to terminal 16, and of ring line 12 and conductor 26 to terminal 17 by a resistor R which has a positive temperature coefficient, i.e., R is a PTCR. The flow of current in either line 11 or line 12 causes the associated PTCR to dissipate power. As a result, the temperature of the PTCR rises. When the temperature has risen to the point at which the resistance of the PTCR abruptly increases by several orders of magnitude, the amplitude of the current is limited to a safe level. In this manner, the equipment, be it a switch or telephone, connected to terminals 16 and 17 is protected from excessive current.

Of course, it should be appreciated that if the flow of current through either PTCR is due to an overvoltage condition which is sufficient to cause the associated portion of gas tube 20 to connect the line on which the condition has occurred to ground, then the current will flow to ground. If the overcurrent is sustained, then the associated solder slug will melt permanently connecting the line to ground.

Figure 2:
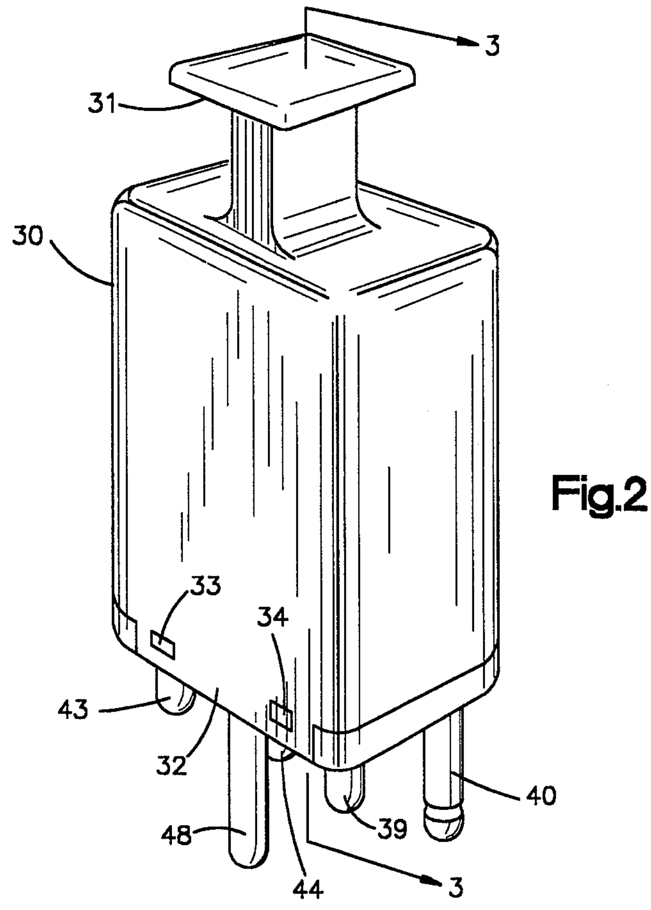
FIG. 2 is an exterior perspective view of the protector housing and base of this invention wherein the protector unit is contained.

Referring now to FIG. 2, there is shown an exterior perspective view of the housing 30 for the protector module of the present invention. As FIG. 2 is identical in all respects to FIG. 2 of the '664 patent, the same reference numerals used therein are used herein. Extending from the base 38 (see FIG. 3) of housing 30 are the equipment pins 39 and 43, the line pins 40 and 44, and the ground pin 48. As is well known in the art, the equipment pins are electrically connected to the T and R lines of the line pair for the equipment to be protected while the line pins are electrically connected to the T and R lines of the incoming line pair.

Figure 3:
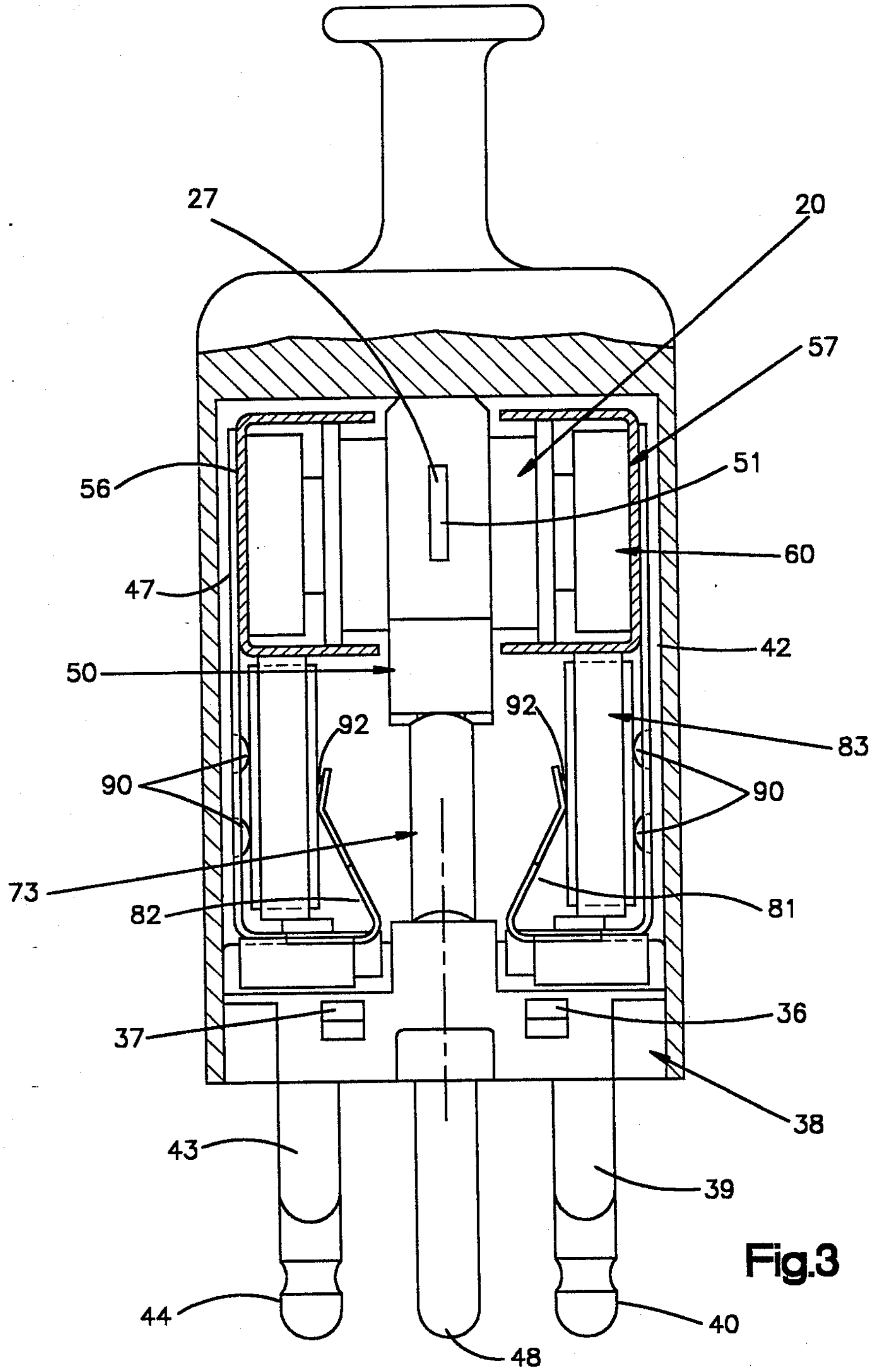
FIG. 3 is a sectional view on an enlarged scale taken along line 3—3 of FIG. 2 showing the protector structure and mounting terminal clips associated therewith.

Referring now to FIG. 3, there is shown on an enlarged scale a sectional view of the protector module of the present invention. As FIG. 3 is, except as otherwise described below, identical to FIG. 3 of the '664 patent, the same reference numerals are used to identify the same elements. As with the module of the '664 patent, the module of the present invention includes first and second leaf spring connector elements 42 and 47 which makes contact with end caps 57 and 56, respectively of the gas tube 20. In addition, the module of the present invention also includes, as does the module of the '664 patent, a clip member 50 at one end of ground pin 48. Member 50 has window or cut-out 51 for firmly engaging the center or ground terminal 27 of protector 20. The module of the present invention further includes, as does the module of the '664 patent, stop sleeve 73 which is positioned over the bent portion 74 (see FIG. 4) of ground pin 48.

In the module of the '664 patent, the bent portion 41 of spring connector element 42 contacts pins 39 and 40 and the bent portion 46 of spring connector element 47 contacts pins 43 and 44. In the module of the present invention, the bent portion 41 of element 42 contacts only pin 40 and the bent portion 46 of element 47 contacts only pin 44. The contacts with pins 39 and 43 are made by leafspring connector elements 81 and 82, respectively. Element 81 is staked to pin 39 and element 82 is staked to pin 43. More specifically, it is bent portion 84 of element 81 which is staked to pin 39 and bent portion 85 of element 82 which is staked to pin 43.

Elements 81 and 82 are each in electrical connection with elements 42 and 47, respectively through a PTCR assembly 83. In effect, the elements 42 and 81 cooperate to hold in place one PTCR assembly 83 and elements 47 and 82 cooperate to hold in place another PTCR assembly 83. A comparison of FIG. 3 with the circuit of FIG. 1 shows that elements 42 and 81 cooperate with one PTCR assembly 83 to provide the path for current flow from equipment pin 39 to line pin 40 and elements 47 and 82 cooperate with the other PTCR assembly 83 to provide the path for current flow from equipment pin 43 to line pin 44.

Figure 4:
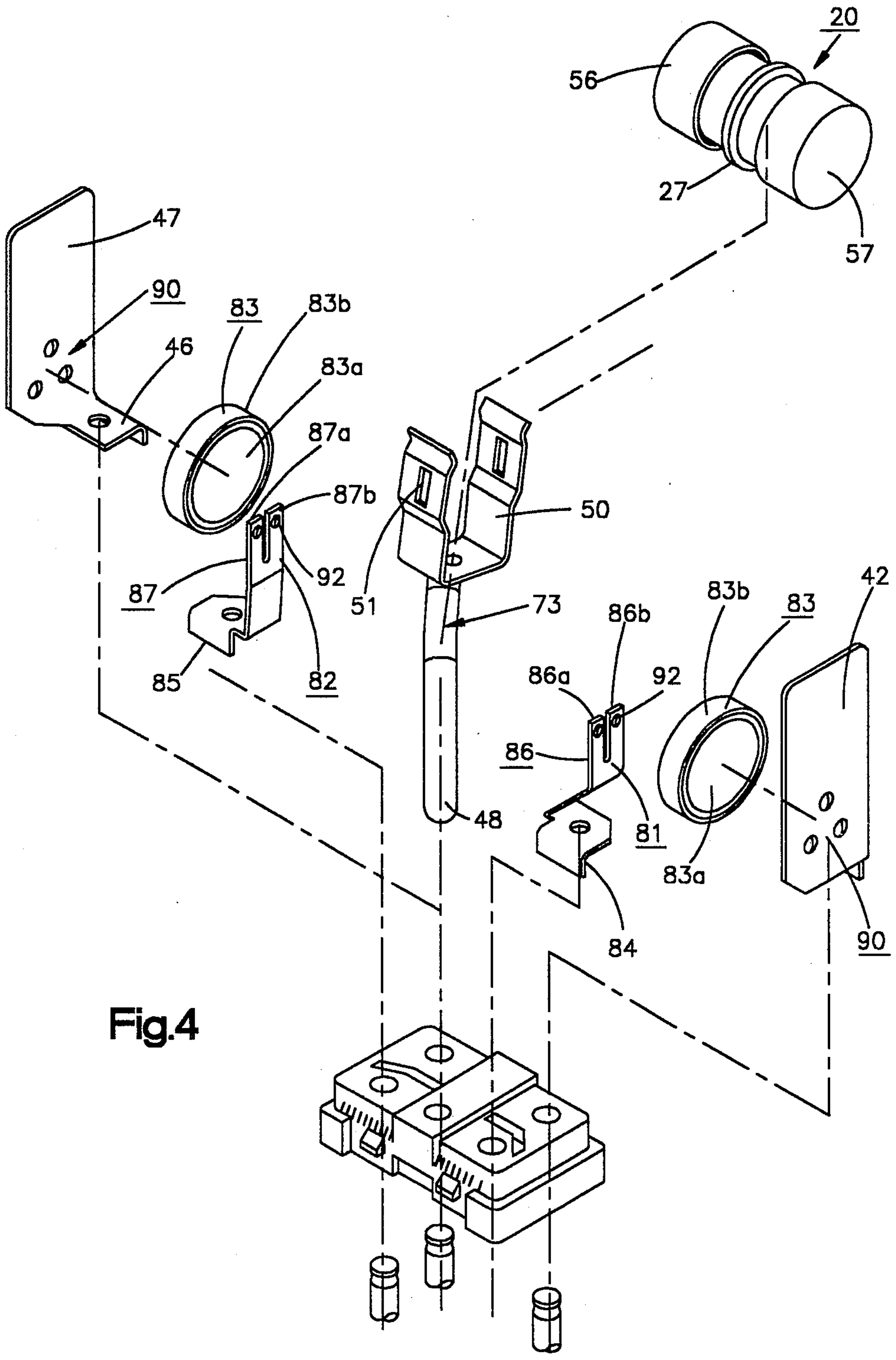
FIG. 4 is an exploded perspective view of the protector unit structure of this invention.

Referring now to FIG. 4, there is shown an exploded perspective view of the protector module of the present invention. For ease of illustration and because it is identical to the housing 30 shown in the'664 patent, the housing is not shown in FIG. 4. In addition, three element gas tube protector element 20 is not shown in exploded form in FIG. 4. It is identical to the protector element 20 of the '664 patent which is shown in exploded form in FIG. 7 of that patent. It is not necessary to describe FIG. 4 in any detail as the function of the elements shown therein should be evident from the discussion above and in particular the discussion of FIG. 3.

PTCR assembly 83 includes a disc PTCR **83*a* available from a number of manufacturers. In one embodiment for the protector module of the present invention, a leadless disc PTCR available from Cera-mite of Grafton, Wisc. was used. An insulator 83*b* in the form of a ring has been placed on the outer edge of the disc 83*a*. The purpose of the insulator is to ensure that the PTCR makes electrical contact only with the associated connector elements 81, 42 and 82, 47. The lower portion of each of connector elements 42, 47 include three outwardly projecting protuberances 90 which make the electrical contact between the element and one side of the associated one of the PTCRs 83*a***.

That part of connector elements 81 and 82 which makes contact with the associated one of the two PTCRs **83*a* are the upwardly projecting portions 86 and 87, respectively. Portions 86 and 87 each have two contacting fingers 86*a* and 86*b* for portion 86 and 87*a* and 87*b* for portion 87. Each of contacting fingers 86*a*, 86*b*, 87*a* and 87*b* have an outwardly projecting protuberance 92 which as can be seen from FIG. 3 are each in contact with the associated one of the PTCRs 83*a*. The fingers then provide two points of electrical contact between elements 81, 82 and the associated one of PTCRs 83***a*. While portions 86 and 87 could each have been designed not to have fingers, i.e., a solid piece, the use of two fingers in each portion is desirable because they have in total lower contact resistance than a solid piece.

In comparing the module of the present invention with that shown in the '664 patent, it is apparent that the connector elements 42 and 47 of the present invention do not have the shape as is shown therefor in the '664 patent. The reason for that difference in shape is that the protector module of the present invention also includes connected to its base, connector elements 81 and 82 which are electrically connected to elements 42 and 47 only through the associated one of the two PTCRs 83*a*. To ensure that there is no other electrical connection between elements 42 and 81 and elements 47 and 82, it was necessary to modify the shape of elements 42 and 47 from that shown in the '664 patent.

Figure 5B:
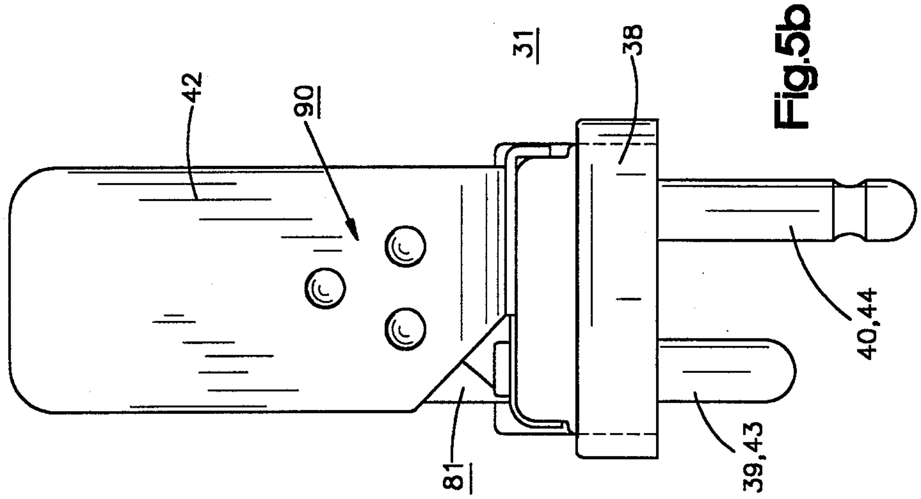
FIGS. 5*a* and 5*b* are front and side views, respectively, of the base assembly of the protector module of the present invention.
Figure 5A:
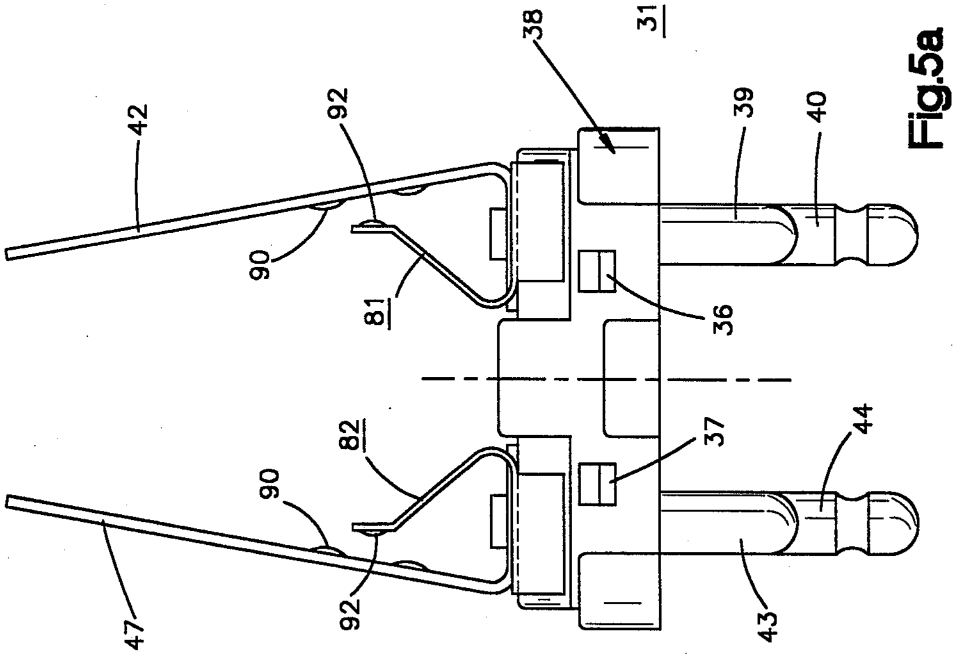

In order to complete the understanding of the present invention, there is shown in FIGS. 5*a* and 5*b* front and side views, respectively, of base 30 of the module in assembled relationship with pins 39, 40, 43, and 44 and connector elements 42, 47, 81 and 82. FIGS. 5*a* and 5*b* taken together illustrate the base assembly 31 of the module. In fabricating the module, the base assembly may be separately manufactured. Final assembly of the module then involves inserting one PTCR assembly 83 between elements 42 and 81, another assembly 83 between elements 47 and 82, the bringing of protector element 20 into firm engagement with clip member 50 of ground pin 48, the placement of stop sleeve 73 on pin 48 and the insertion of pin 48 so assembled into the hole in base 38 therefor. Housing 30 is then placed over the base assembly so that apertures 33 and 34 (see FIG. 2) engage protuberances 36 and 37, respectively, in base assembly 31 (see FIG. 5*a*).

While the present invention has been described in connection with a module that uses a three element, i.e., electrode, gas tube as a surge voltage arrestor it should be appreciated that the arrestor need not be a gas tube. It should further be appreciated that the PTCRs function to limit the amplitude of the current flowing through them to be no greater than a predetermined amplitude.

It is to be understood that the description of the preferred embodiment is intended to be only illustrative, rather than exhaustive, of the present invention. Those of ordinary skill will be able to make certain additions, deletions, and/or modifications to the embodiment of the disclosed subject matter without departing from the spirit of the invention or its scope, as defined by the appended claims.

What is claimed is:

1. A line protector for a communications circuit comprising:
   (a) an insulating means;
   (b) a surge voltage arrestor in spaced relationship to said insulating means, said arrestor having opposed electrodes;
   (c) first and second conductive elements on said insulating means and extending therefrom so as to be in electrical contact, respectively, with said opposed electrodes;
   (d) third and fourth conductive elements on said insulating means and extending therefrom towards said arrestor; and
   (e) two devices each having the capability of limiting current flowing therein to have an amplitude which is no greater than a predetermined amplitude, one of said devices in contact with said first and third conductive elements to provide a conductive path therebetween and the other of said devices in contact with said second and fourth conductive elements to provide a conductive path therebetween.

2. The line protector of claim 1 wherein each of said devices are leadless and have a resistance which increases substantially in magnitude when the temperature of said device rises to a predetermined temperature above ambient temperature.

3. The line protector of claim 1 wherein said surge voltage arrestor has an electrode intermediate said opposed electrodes and said line protector further comprises a fifth conductive element extending from said insulating means and connected to said intermediate electrode.

4. The line protector of claim 1 wherein each of said devices has opposed conductive faces, said oppposed conductive faces of one of said devices in contact with said first and third conductive elements, resepctively, and said opposed conductive faces of the other of said devices in contact with said second and fourth conductive elements, respectively.

5. The line protector of claim 1 wherein said surge voltage arrestor is of the spark gap type.

6. A line protector for a communications circuit comprising:
   (a) a base having first and second line input terminals therein and first and second equipment terminals therein;
   (b) an overvoltage arrestor in spaced relationship to said base, said arrestor having first and second electrodes;
   (c) first and second conductive means secured to said first and second line input terminals, respectively, and extending therefrom so as to be in electrical connection with said first and second electrodes, respectively;
   (d) third and fourth conductive means secured to said first and second equipment terminals, respectively, and extending therefrom towards said overvoltage arrestor; and
   (e) two devices each having the capability of limiting current therein to have an amplitude which is no greater than a predetermined amplitude, one of said devices in contact with said first and third conductive means to provide a conductive path therebetween and the other of said devices in contact with said second and fourth conductive means to provide a conductive path therebetween.

7. The line protector of claim 6 wherein each of said devices are leadless and have a resistance which increases substantially in magnitude when the temperature of said device rises to a predetermined temperature above ambient temperature.

8. The line protector of claim 6 wherein said overvoltage arrestor has a third electrode intermediate said first and second electrodes and said line protector further comprises a ground terminal in said base and extending therefrom to be connected to said third electrode.

9. The line protector of claim 6 wherein each of said devices has opposed conductive faces, said opposed conductive faces of one of said devices in contact with said first conductive means and said third conductive means, respectively and said opposed conductive faces of the other of said devices in contact with said second conductive means and said fourth conductive means, respectively.

10. The line protector of claim 6 wherein said surge voltage arrestor is of the spark gap type.

* * * * *